United States Patent
Yu (10) Patent No.: US 9,914,538 B2
(45) Date of Patent: Mar. 13, 2018

(54) ROTOR SHROUDING APPARATUS, SUPPORTING ASSEMBLY, AND UNMANNED AERIAL VEHICLE USING THE SAME

(71) Applicant: ZEROTECH (Shenzhen) Intelligence Robot Co., Ltd, Shenzhen (CN)

(72) Inventor: Wei-Yong Yu, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 0 days.

(21) Appl. No.: 15/356,327

(22) Filed: Nov. 18, 2016

(65) Prior Publication Data

US 2017/0144753 A1    May 25, 2017

(30) Foreign Application Priority Data

Nov. 20, 2015 (CN) .................... 2015 2 0932562 U
Nov. 20, 2015 (CN) .................... 2015 2 0933286 U (51) Int. Cl.
| | |
|---|---|
| *B64C 27/20* | (2006.01) |
| *B64C 27/08* | (2006.01) |
| *B64C 39/02* | (2006.01) |
| *B64C 11/00* | (2006.01) |
| *B64C 27/00* | (2006.01) |
| *A63H 27/00* | (2006.01) |

(52) U.S. Cl.
CPC ........... *B64C 39/024* (2013.01); *A63H 27/12* (2013.01); *B64C 11/001* (2013.01); *B64C 27/006* (2013.01); *B64C 27/08* (2013.01); *B64C 27/20* (2013.01); *B64C 2201/027* (2013.01); *B64C 2201/042* (2013.01)

(58) Field of Classification Search
CPC ....... B64C 27/20; B64C 27/08; B64C 27/006; B64C 11/001; B64C 39/024
See application file for complete search history.

(56) References Cited

U.S. PATENT DOCUMENTS

| | | | | |
|---|---|---|---|---|
| 8,322,648 | B2 * | 12/2012 | Kroetsch | B64C 39/024 244/17.23 |
| 8,794,564 | B2 * | 8/2014 | Hutson | B64C 27/006 244/17.17 |
| 8,973,861 | B2 * | 3/2015 | Zhou | B64C 27/20 244/17.23 |
| 2015/0129711 | A1 * | 5/2015 | Caubel | B64C 27/08 244/17.23 |
| 2015/0321759 | A1 * | 11/2015 | Caubel | B64C 39/024 244/17.23 |

(Continued)

FOREIGN PATENT DOCUMENTS

CN          203318681          12/2013

*Primary Examiner* — Richard R Green (57) ABSTRACT

A supporting assembly for an unmanned aerial vehicle is disclosed. The supporting assembly includes a base, rotor arms, and rotor shrouds. The rotor arms extend from the base. Each of the rotor arms includes a proximal end secured to the base and a distal end opposite to the proximal end. Each of the rotor shrouds includes a converged end removably engaged with and secured to the distal end, an arc shaped end, and one or more connecting members extending from the arc shaped end to the converged end. An unmanned aerial vehicle and a rotor shroud apparatus are also disclosed.

19 Claims, 10 Drawing Sheets

(56) References Cited

U.S. PATENT DOCUMENTS

| | | | | |
|---|---|---|---|---|
| 2016/0221671 A1* | 8/2016 | Fisher | .................... | B64C 27/08 |
| 2016/0297545 A1* | 10/2016 | Yang | .................... | B64C 39/024 |
| 2016/0318615 A1* | 11/2016 | Pick | .................... | B64C 39/024 |
| 2017/0043869 A1* | 2/2017 | Howard | .................. | B64C 27/08 |

* cited by examiner

ROTOR SHROUDING APPARATUS, SUPPORTING ASSEMBLY, AND UNMANNED AERIAL VEHICLE USING THE SAME

CROSS-REFERENCE TO RELATED APPLICATIONS

This application claims all benefits accruing under 35 U.S.C. § 119 from China Patent Applications No. 201520933286.9, filed on Nov. 20, 2015 and No. 201520932562.X, filed on Nov. 20, 2015 in the China Intellectual Property Office, the contents of which are hereby incorporated by reference.

FIELD

The present disclosure relates to multi-rotor aerial vehicles, and more particularly to rotor shrouding apparatus, supporting assemblies, and unmanned aerial vehicles using the same.

BACKGROUND

An unmanned aerial vehicle (UAV), commonly known as a drone, is an aircraft without a human pilot aboard. Small sized UAVs are increasingly used in various fields such as aerial photography, surveillance, scientific research, geological survey, and remote sensing. The UAVs include rotors or propellers generating thrust to control orientation and speed of the vehicle. Unprotected spinning blades of the rotors pose a safety risk to operator, and are likely to be damaged upon contact with an object. Shrouds may be provided in the UAVs to protect the rotors.

The UAVs are commonly disassembled in storage. To implement flight, and store the UAVs after the flight, users assemble and disassemble the UAVs with complicated and numerous separate parts, which are time consuming especially for untrained users.

BRIEF DESCRIPTION OF THE DRAWINGS

Implementations are described by way of example only with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In the present disclosure, the terms "upper," "lower," "top," "bottom," "vertical," "horizontal" and other similar direction-indicating terms are used with reference to the unmanned aerial vehicle ("UAV") in its normal operational mode, and should not be considered limiting.

Figure 1:
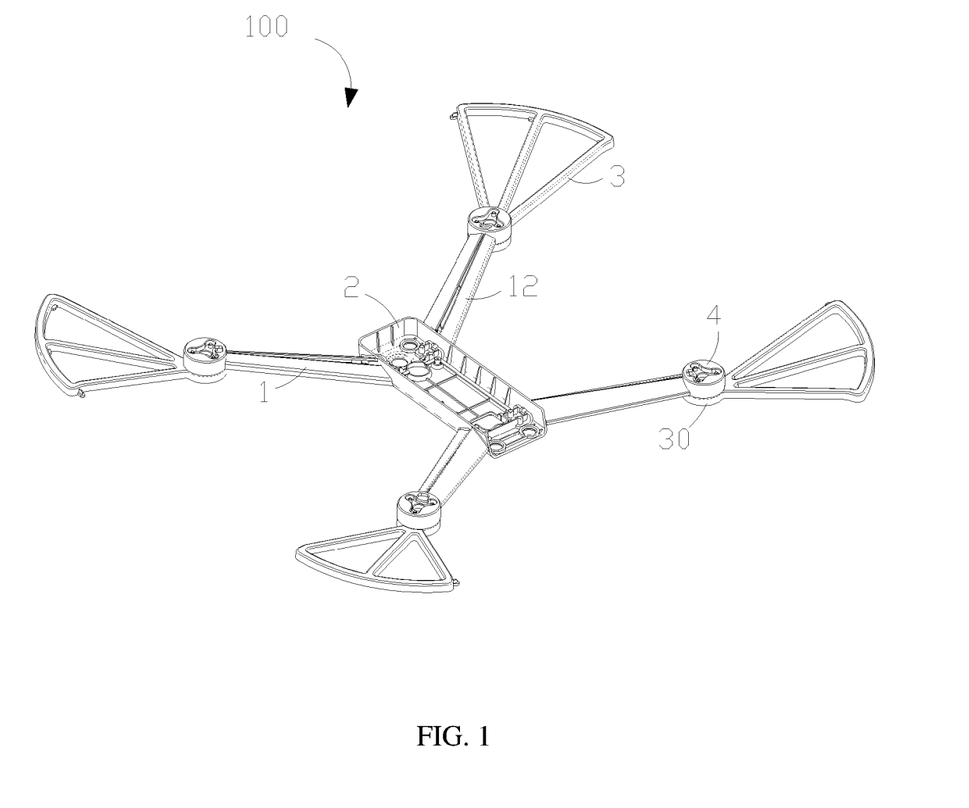
FIG. 1 is an isometric view from a top side of one embodiment of a supporting assembly.
Figure 2:
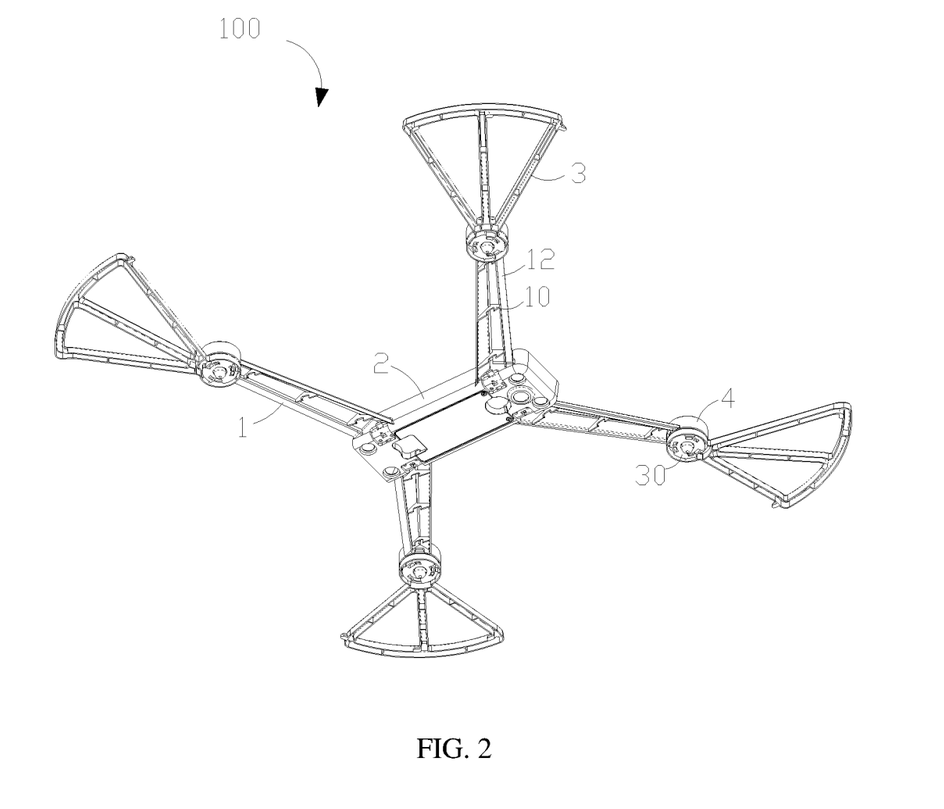
FIG. 2 is another isometric view from a bottom side of the supporting assembly of FIG. 1.

Referring to FIG. 1 and FIG. 2, one embodiment of a supporting assembly 100 of a UAV is disclosed. The supporting assembly 100 comprises a base 2, a plurality of rotor arms 1, and a plurality of rotor shrouds 3. Each rotor arm 1 comprises a proximal end and a distal end opposite to the proximal end. The rotor arms 1 are each secured to the base 2 at the proximal end, and extend out from the base 2 in different directions. The rotor shrouds 3 each comprise a converged end, an arc shaped end or outer frame 32, and one or more connecting members or struts 31 extending from the arc shaped end to the converged end. The converged end is coupled to the arc shaped end 32 opposite to the converged end by the one or more connecting members 31. The converged ends of the plurality of rotor shrouds 3 are removably secured to the distal ends of the plurality of rotor arms 1 in a one-to-one manner.

The base 2 is configured to carry a payload such as electrical components adapted to control various aspects of the operation of the UAV. The electrical components can comprise at least one of an energy source (e.g., battery), a flight control or navigation module, a GPS module (e.g., GPS receivers or transceivers), an inertial measurement unit (IMU) module, a communication module (e.g., wireless transceiver), and an electronic speed control (ESC) module adapted to control an actuator (e.g., electric motor). The payload can also include an application device such as a camera, video camera, or pesticide sprayer. A through hole can be defined on the base 2, so that the application device can extend from one top side of the base 2, through the through hole, and out to an opposite bottom side of the base 2. In one embodiment, the base 2 comprises a bottom board and side walls extending from edges of the bottom board. The bottom board and the sidewalls can cooperatively form an interior space. The shape of the bottom board is not limited and can be round, oval, triangle, square, rectangle, pentagon, or hexagon shaped.

The plurality of rotor arms 1 can be arranged symmetrically with respect to a center of the base 2 or an axis of the base 2. The plurality of rotor arms 1 can have the same length and extend to the same vertical height with respect to the base 2. The number of the rotor arms 1 can be three to six. In one embodiment, the supporting assembly 100 comprises four rotor arms 1 symmetrically extending from the base 2 in four different directions. The four rotor arms 1 can be respectively secured to the side walls of the base 2 and adjacent to the four corners of a rectangular shaped bottom board of the base 2. In another embodiment, the supporting assembly 100 comprises six rotor arms 1 symmetrically extending from the base 2 in six different directions.

The rotor arm 1 can define a wiring channel extending inside the rotor arm 1 from the proximal end to the distal end and communicate with the interior space of the base 2 through holes defined in the side walls of the base 2. The wiring channel is adapted to accommodate electrical wiring running therethrough to connect a motor adjacent to the distal end with the electrical component carried on the base 2. The rotor arm 1 comprises an arm body. In one embodiment, the arm body comprises two sloping roofs 12 joined at a top edge and sloping down and away from each other to define the wiring channel between the two sloping roofs 12. The rotor arm 1 can further comprise one or more beams 10. The one or more beams 10 can be substantially perpendicular to the extending direction of the arm body inside the wiring channel. In one embodiment, the one or more beams 10 support the two sloping roofs 12. The beams 10 are configured for enhancing the strength of the rotor arm 1, so as to increase reliability and lifespan. The beams 10 can be spaced from each other and located at different locations along a length or extending direction of the rotor arm 1. The beam 10 can have a cutout at its middle portion spaced from the two slopping roofs 12. The electrical wiring can run through the wiring channel below or through the cutout of the beam 10. The plurality of rotor arms 1 can be integrally formed with the base 2 as one piece.

Figure 3:
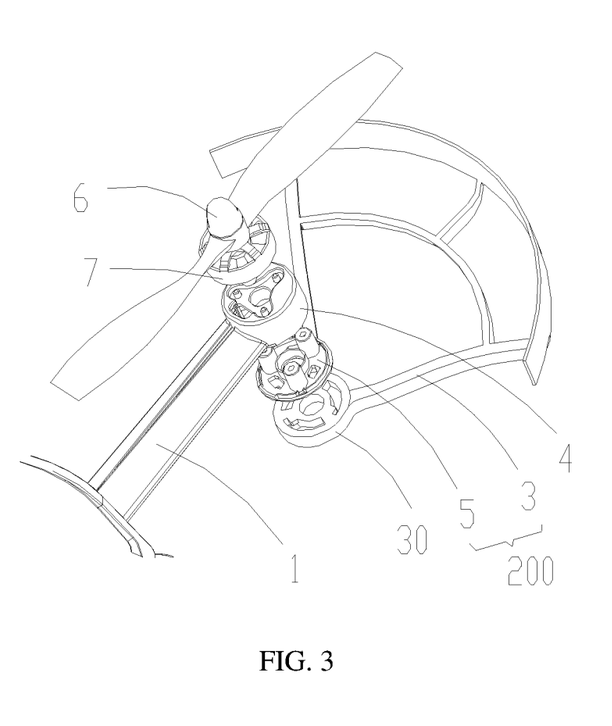
FIG. 3 is an exploded view from a top side of a partial of one embodiment of the supporting assembly.
Figure 4:
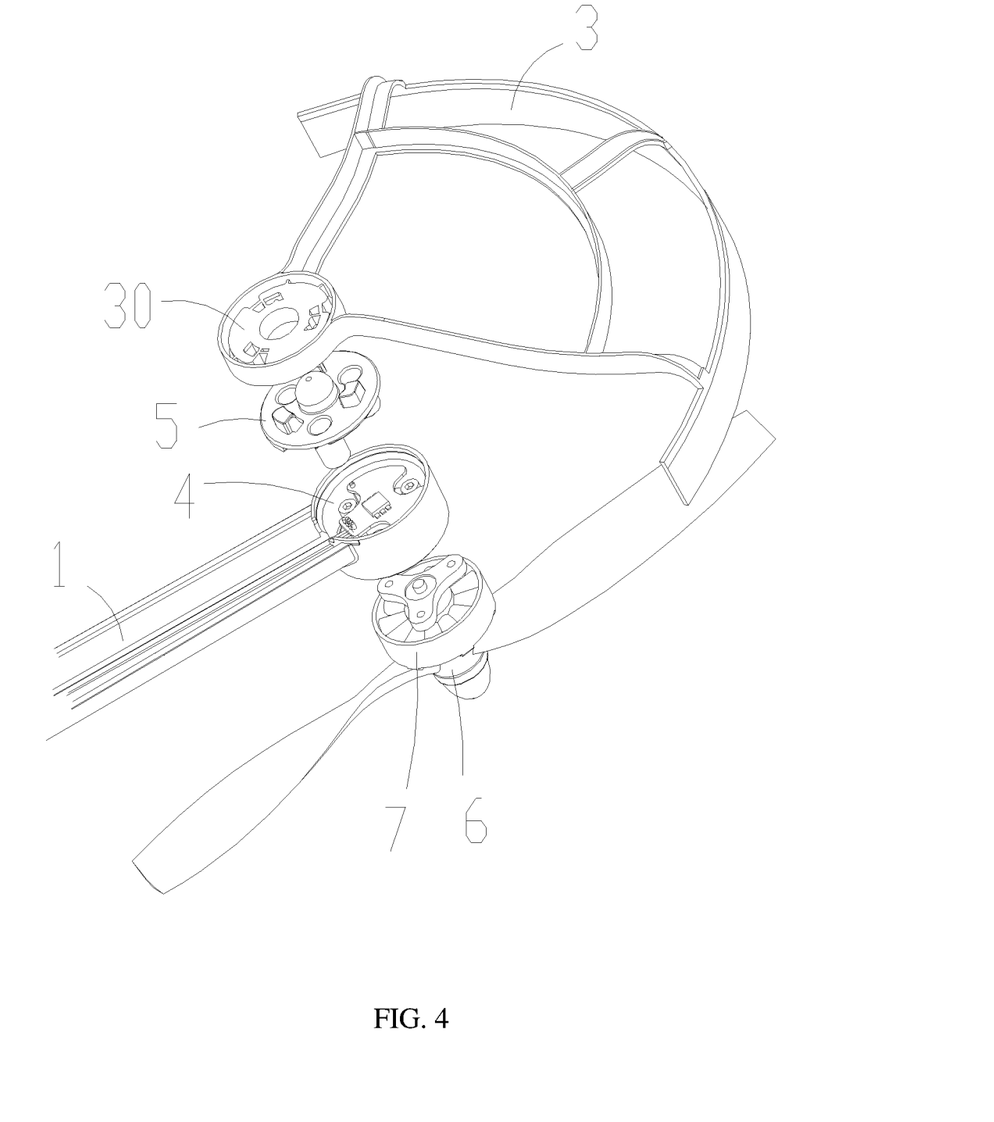
FIG. 4 is another exploded view from a bottom side of the partial of the supporting assembly of FIG. 3.

Referring to FIG. 3 and FIG. 4, the distal ends of the rotor arms 1 are configured for having rotor assemblies connected thereto in a one-to-one manner. Each rotor assembly comprises a rotor 6 and an actuator 7 to actuate the rotor 6. In one example, the rotor 6 can be a propeller, and the actuator 7 can be an electric motor, which when operated, rotates the blades of the propeller. The supporting assembly 100 can further comprise a plurality of motor seats 4 secured to the distal ends of the plurality of rotor arms 1 in a one-to-one manner. The rotor assemblies can be mounted to the motor seats 4. In some embodiments, a plurality of through holes extend through a Y-shaped groove in the motor seat 4 to receive means (e.g., screws) that fix the actuator 7 on a top of the motor seat 4. In some other embodiments, the motor seat 4 can comprise a receptacle that is shaped and configured to receive a connector of the rotor assembly in order to fix the actuator 7 to the top of the motor seat 4. The plurality of motor seats 4, the plurality of rotor arms 1, and the base 2 can be integrated together as one piece to minimize the number of components in the supporting assembly 100 and the UAV.

The distal ends of the rotor arms 1 are also configured for having rotor shrouds 3 coupled thereto in a one-to-one manner. The converged end of the plurality of rotor shrouds 3 can be removably engaged with and secured to the distal end of the plurality of rotor arms 1 through means, such as a snap-fit engagement, plug-in engagement, hooking engagement, socket-buckle engagement, or mating engagement. The rotor shrouds 3 can be swiftly assembled and disassembled by moving the rotor shrouds 3 with respect to the rotor arm 1. In some embodiments, the supporting assembly 100 further comprises a plurality of shroud seats 5, and the rotor shrouds 3 are removably engaged with and secured to the distal ends of the plurality of rotor arms 1 through the motor seats 4 and the shroud seats 5 in a one-to-one manner.

The rotor shroud 3 is configured for protecting the rotor 6 and comprises a protecting surface having a circular sector shape between the converged end and the arc shaped end 32. A central angle of the circular sector shaped protecting surface can be in a range from about 60° to about 120°. The rotor shroud 3 can be assembled (e.g., secured) to the rotor arm 1 in a connected position and disassembled (e.g., removed) from the rotor arm 1 in a disconnected position. In the connected position, the protecting surface extends from the distal end of the rotor arm 1 and inclined upward with respect to the rotor arm 1. A size (e.g., a distance between the converged end to the arc shaped end 32 along a direction parallel to a rotating surface of the rotor 6) of the rotor shroud 3 can be larger than the radius of the rotor 6, so that in the connected position, the arc shaped end 32 can extend radially past the rotor 6. In the connected position, the arc shaped end 32 of the rotor shroud 3 can be spaced above (e.g., up to about 3 mm to about 5 mm) the rotor 6 mounted on the distal end of the rotor arm 1.

Figure 5:
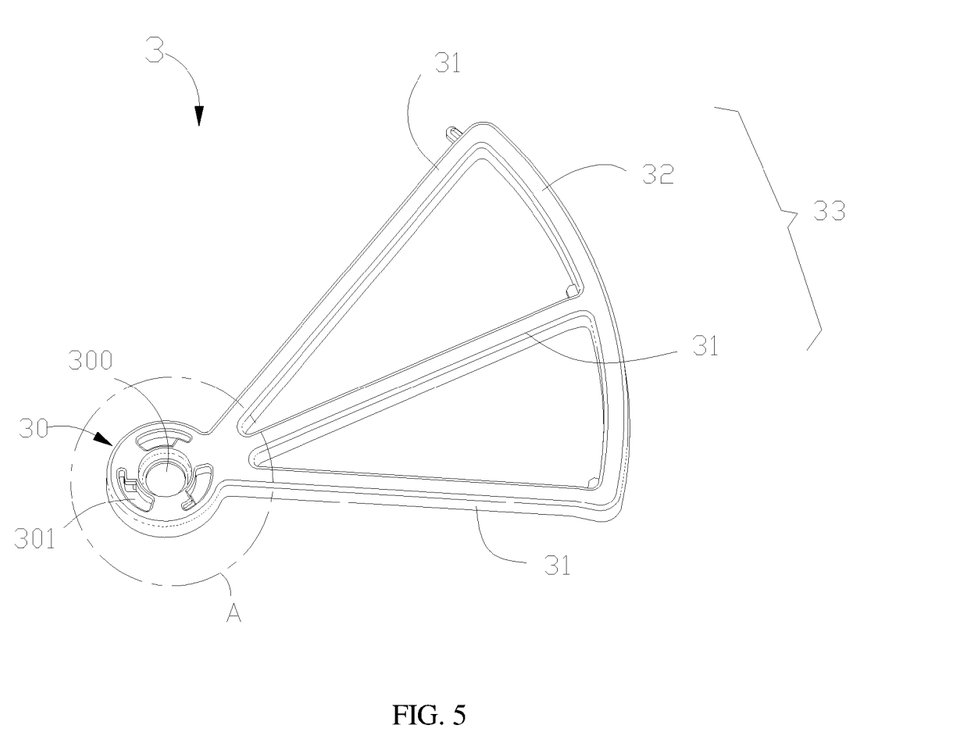
FIG. 5 is an isometric view from a top side of one embodiment of a rotor shroud.
Figure 6:
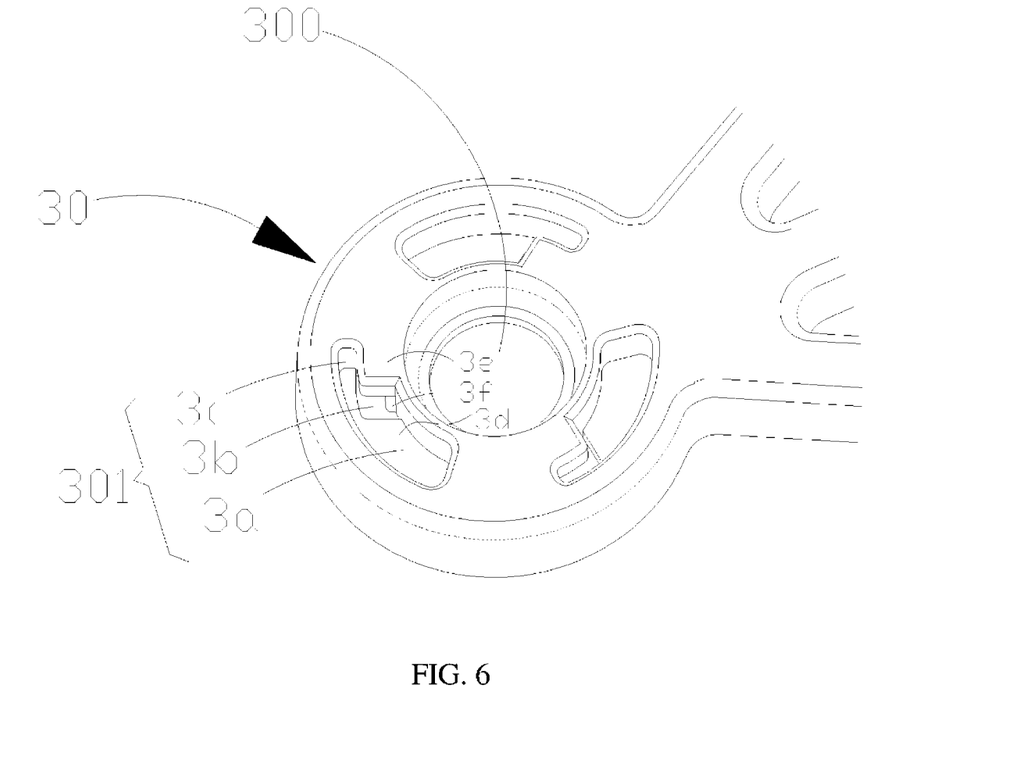
FIG. 6 is an enlarged isometric view of a circled portion A of FIG. 5.
Figure 7:
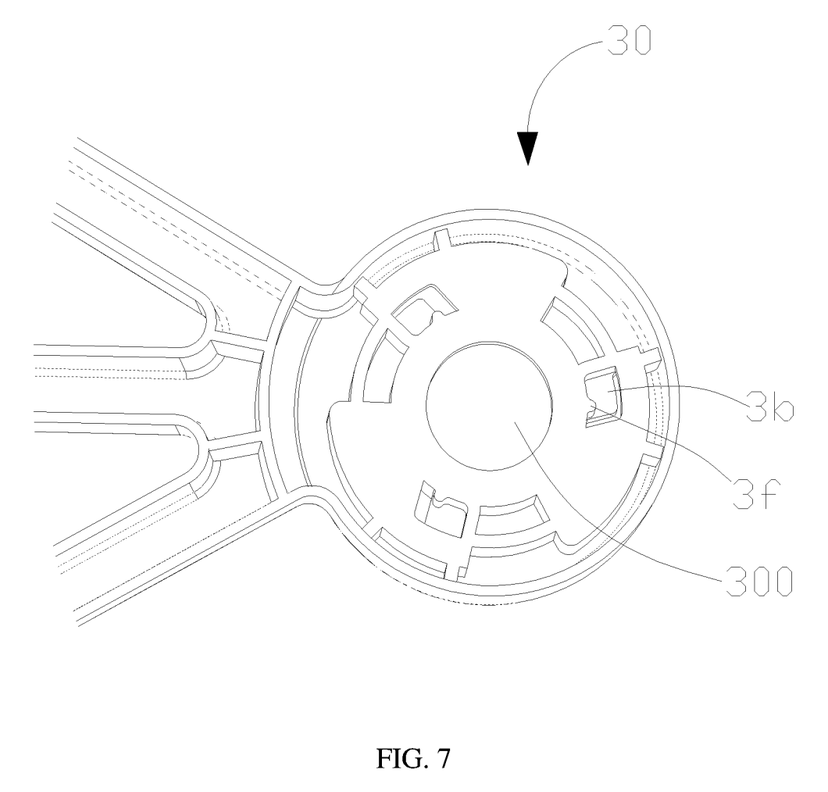
FIG. 7 is an enlarged bottom view of the part of the rotor shroud of FIG. 6.

Referring to FIG. 5, each rotor shroud 3 can comprise a locking member 30 located at the converged end of the rotor shroud 3 and a circular sector shaped shroud body 33. The shroud body 33 defines the protecting surface, and includes the converged end connected to the locking member 30 and the arc shaped end 32. The shroud body 33 and the locking member 30 can be integrated with each other as one piece.

The circular sector shaped shroud body 33 can be a frame structure comprising a converged end, an arc shaped outer frame 32, and a plurality of protecting struts 31 extending radially from the converged end to the arc shape outer frame 32 to cooperatively define the circular sector shape. An angle between two outermost protecting struts 31 can be in a range from about 60° to about 120°. The plurality of protecting struts 31 can be located in the same plane. In one embodiment, the plurality of protecting struts 31 directly extend from the locking member 30. The protecting struts 31 and the arc shaped outer frame 32 can be elongated members such as rods, sticks, canes, columns, bars, or the like. In one embodiment, the circular sector shaped shroud body 33 comprises three protecting struts 31 located in the same plane, with the first end of the protecting struts 31 secured to a same location of the locking member 30, and the second end of the protecting struts 31 respectively secured to two ends and the middle of the arc shaped outer frame 32.

Referring back to FIG. 3, the locking member 30 is configured to be removably mounted on the bottom of the motor seat 4 through means such as the shroud seat 5. The rotor shroud 3 and the shroud seat 5 can be assembled together as a rotor shroud apparatus 200. The shroud seat 5 can be removably engaged with and secured to the locking member 30 through means, such as snap-fit engagement, plug-in engagement, hooking engagement, socket-buckle engagement, or mating engagement. The means allows the rotor shroud 3 to be swiftly assembled to and disassembled from the shroud seat 5. The assembly and disassembly can be performed by moving the rotor shrouds 3 with respect to the shroud seat 5. The shroud seat 5 does not need to be removed or disassembled from the motor seat 4.

Referring to FIG. 6 to FIG. 9, in one embodiment, the locking member 30 can comprise at least one socket 301. The shroud seat 5 can comprise a seat base 50 and at least one buckle 53. The seat base 50 can have a round disk shape having an upper surface and a lower surface. The at least one buckle 53 protrudes from the lower surface of the seat base 50. The buckle 53 can be integrated with the seat base 50 as one piece. The socket 301 and the buckle 53 are shaped and configured to engage and be secured with each other to complete the rotor shroud apparatus 200.

In one embodiment, the socket 301 defines a preplace hole 3a, a locking hole 3b, and a sliding channel 3c communicating with the preplace hole 3a and the locking hole 3b. The preplace hole 3a is defined on an upper surface of the locking member 30, and is adapted to receive the buckle 53 in the disconnected position before completing the engagement. The socket 301 can further comprise a first board 3d defining a bottom of the preplace hole 3a. The locking hole 3b is adapted to receive the buckle 53 in the connected position where the engagement of the socket 301 and the buckle 53 engage. The locking hole 3b can be defined in the locking member 30, or on a lower surface of the locking member 30. The socket 301 can further comprise a second board 3e defining a top of the locking hole 3b. The sliding channel 3c connects the preplace hole 3a and the locking hole 3b, and is adapted to allow the buckle 53 to slide from the preplace hole 3a to the locking hole 3b, so as to move the buckle 53 with respect to the socket 301 between the disconnected position and the connected position.

The buckle 53 comprises a sliding wall 5a protruding from the lower surface of the seat base 50 and a locking board 5b connected to the sliding wall 5a. The locking board 5b has a shape that is capable of engaging with the locking hole 3b. The sliding wall 5a has a shape that is capable of sliding in and engaging with the sliding channel 3c. The locking board 5b can be substantially parallel to the lower surface of the seat base 50. The sliding wall 5a can be substantially perpendicular to the lower surface of the seat base 50. The sliding wall 5a and the locking board 5b are connected with each other at edges to form an "L" shaped structure. The sliding wall 5a and the locking board 5b can be integrated with each other as one piece. The sliding channel 3c and the locking hole 3b forms an "L" shaped space corresponding to the "L" shaped structure. In the connected position, the sliding wall 5a is located in and engaged with the sliding channel 3c, and the locking board 5b is located in and engaged with the locking hole 3b. The second board 3e restricts the locking board 5b from being movable along a vertical direction.

The buckle 53 can further comprise a blocking wall 5c protruded from the lower surface of the seat base 50 and connect to both the sliding wall 5a and the locking board 5b. The sliding wall 5a, the locking board 5b, and the blocking wall 5c can be integrated with each other as one piece. In the connected position, the blocking wall 5c can be in contact with an edge of the first board 3d and be prevented by the first board 3d from being movable along a horizontal direction.

A through hole 500 can be defined on the seat base 50 above the locking board 5b. The through hole 500 can provide a space for containing a portion of the second board 3e during the sliding of the sliding wall 5a into the sliding channel 3c to facilitate assembly of the shroud seat 5 with the rotor shroud 3.

The socket 301 can further comprise a protrusion or recess 3f protruding towards or recessed from the locking hole 3b, respectively, along a direction traversing a sliding direction of the buckle 53. The locking board 5b can define a recess or protrusion 5d on a side of the locking board 5b. The recess or protrusion 5d is adapted to respectively engage with the protrusion or recess 3f to further secure the locking board 5b in the locking hole 3b.

The socket 301 and the buckle 53 can be arc shaped and capable of engaging each other through a relative rotation between the socket 301 and the buckle 53 around a vertical axis. The arc shaped socket 301 and the arc shaped buckle 53 can be homocentric. The sliding channel 3c and the sliding wall 5a can be arc shaped and corresponded with each other (e.g., be homocentric), so that by rotating the locking member 30 relative to the shroud seat 5 around the vertical axis, the buckles 53 are capable of engaging with and releasing from the socket 301. The locking member 30 can comprise a plurality of sockets 301, and the shroud seat 5 can comprise a plurality of buckles 53 that are configured to engage with the plurality of sockets 301 in a one-to-one manner. The plurality of sockets 301 can be arranged around a first vertical axis of the locking member 30. The first vertical axis can be located at the center of the arc shaped sockets 301. The plurality of buckles 53 can be arranged around a second vertical axis of the shroud seat 5. The second vertical axis can be located at the center of the arc shaped buckles 53. The first and second vertical axes of the locking member 30 and the shroud seat 5 can be aligned with each other (e.g., to form a homocentric axis) during the assembling of the rotor shroud 3 with the shroud seat 5. In one embodiment, the locking member 30 comprises three sockets 301 evenly disposed around the vertical axis by having an angle of about 120° therebetween. The shroud seat 5 comprises three buckles 53 evenly disposed around the vertical axis by having an angle of about 120° therebetween.

In assembling, the seat base 50 can be firstly fixed to the bottom of the motor seat 4, and then the buckle 53 can be disposed in the preplace hole 3a. By rotating the rotor shroud 3 relative to the seat base 50 around the homocentric axis, the sliding wall 5a slides into the sliding channel 3c, and the locking board 5b slides into the locking hole 3b and is secured by the locking hole 3b. In disassembling, by rotating the rotor shroud 3 relative to the seat base 50 along a counter direction around the homocentric axis, the sliding wall 5a slides out from the sliding channel 3c, and the locking board 5b can be released from the locking hole 3b.

The locking member 30 can further define a lamp hole 300, which can be a round through hole, at the vertical axis of the locking member 30. The shroud seat 5 can further comprise a lampshade 52, which is a housing member to accommodate a light source therein at the vertical axis of the shroud seat 5. The lampshade 52 can protrude from the lower surface of the seat base 50, and can have a dome shape that corresponds to the lamp hole 300, and can be capable of being received by the lamp hole 300 from the upper side of the locking member 30. In the connected position, the lampshade 52 is located in the lamp hole 300 and exposed from the lower side of the locking member 30. Light can penetrate out from the lampshade 52 and facilitate a night flight of the UAV. A wiring of the light source can go through the wiring channel in the rotor arm 1 to reach the electrical components on the base 2.

Figure 8:
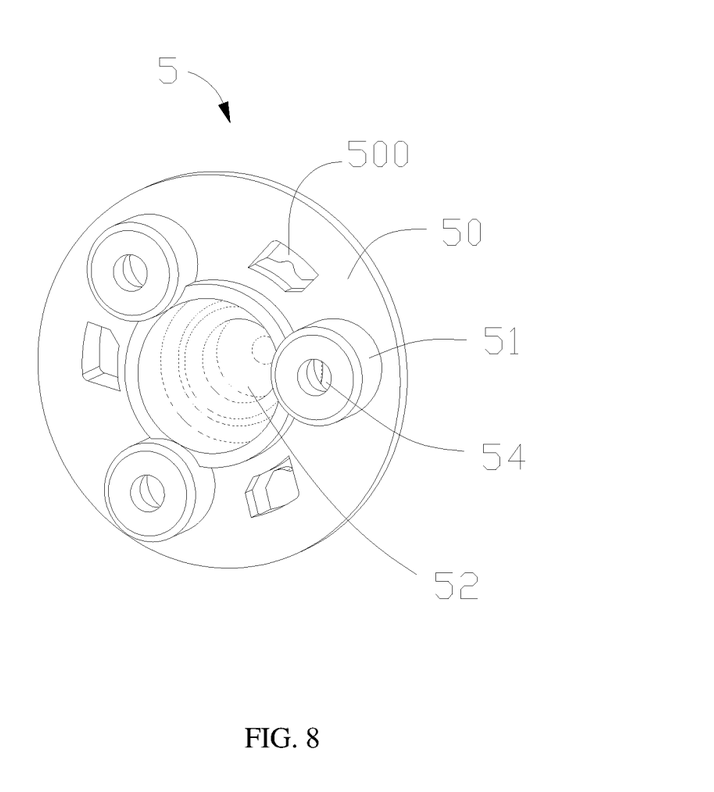
FIG. 8 is an isometric view from a top side of one embodiment of a shroud seat.
Figure 9:
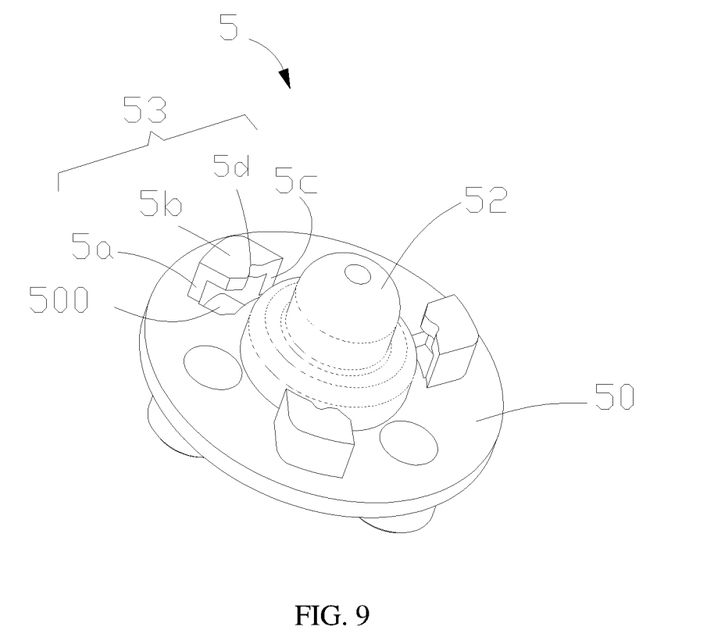
FIG. 9 is another isometric view from a bottom side of the shroud seat of FIG. 8.

The plurality of shroud seats 5 are configured for removably securing the rotor shrouds 3 to a distal end of the rotor arm 1, and especially to the motor seats 4. The plurality of shroud seats 5 can be mounted on a bottom of the plurality of motor seats 4 in a one-to-one manner via fasteners such as screw, bolt, buckle, clamp, clasp, latch, hook, nail, pin strap, cable, or the like. The motor seat 4 can comprise a housing member, which can be a cylinder, having an opening towards the bottom side. The housing member defines a cavity to receive the shroud seat 5. In one embodiment, the shroud seat 5 defines several screw holes 54 to receive means (e.g., fasteners or screws) for fixing the shroud seat 5 to the bottom of the motor seat 4. The screws for fixing the shroud seat 5 can be the same screws for fixing the actuator, which go through the "Y" shaped through channel from the actuator to the shroud seat 5. In one embodiment, the shroud seat 5 can comprise means, such as column protrusions 51 protruding from the upper surface of the seat base 50 to secure the motor seat 4. Each column protrusion 51 defines a screw hole 54 to receive the screw securing the shroud seat 5 to the motor seat 4.

Figure 10:
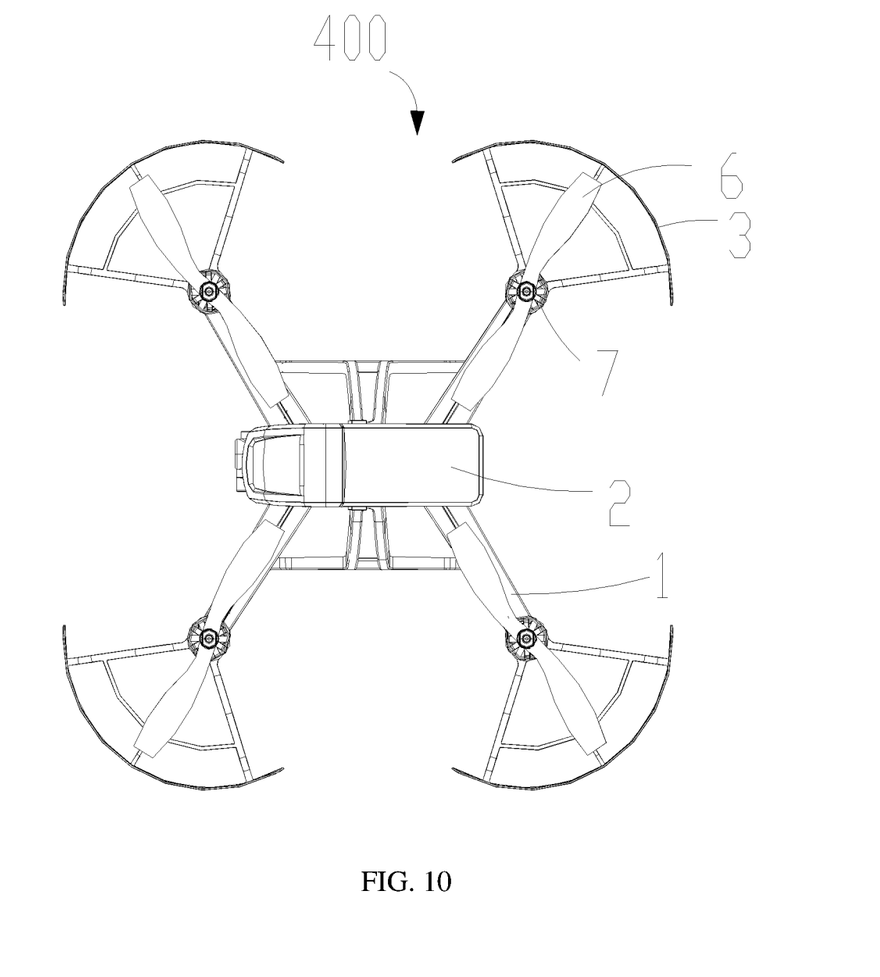
FIG. 10 is a top view of one embodiment of an unmanned aerial vehicle.

Referring to FIG. 10, one embodiment of a UAV 400 comprises the supporting assembly 100, a plurality of rotor assembles mounted on the distal ends of the plurality of rotor arm 1 in a one-to-one manner, and the payload carried by the base 2. Each rotor assembly comprises the rotor 6 (e.g., propeller) rotatably about a rotor axis and the actuator 7 (e.g., electric motor) to actuate blades or paddles of the rotor 6 such that the rotor 6 exerts an upward lift force on the rotor arm 1.

The rotor assembly can be mounted on top of the motor seat 4. The actuator 7 can be fixedly and removably mounted on the motor seat 4 via fasteners such as a screw, bolt, buckle, clamp, clasp, latch, hook, nail, pin strap, cable, or the like. The rotor 6 can be mounted on the motor seat 4 and rotatably about the rotor axis along a vertical direction.

The rotor shroud apparatus 200 surrounds the rotor 6 from outer and lower sides, preventing the rotor 6 from being damaged by contacting object, and protecting the operator from being hurt by the blades of the rotor 6. The rotor shroud 3 and the rotor shroud apparatus 200 can be easily assembled and disassembled to save time. The rotor shroud apparatus 200, supporting assembly 100, and UAV 400 are simplified in designs, which can be easily manufactured and light in weight.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A supporting assembly for an unmanned aerial vehicle, the supporting assembly comprising:
   a base;
   a plurality of rotor arms extending from the base, each of the plurality of rotor arms comprising a proximal end secured to the base and a distal end opposite to the proximal end;
   a plurality of motor seats secured to the distal ends of the plurality of rotor arms in a one-to-one manner;
   a plurality of rotor shrouds, each of the plurality of rotor shrouds comprising a converged end, an arc shaped end, and a locking member at the converged end, the converged end being removably engaged with and secured to the distal end of the rotor arm by rotating the each of the plurality of rotor shrouds with respect to the rotor arm around a vertical axis;
   a plurality of shroud seats being configured to be mounted to the plurality of motor seats in a one-to-one manner;
   wherein the locking members of the plurality of rotor shrouds are configured to secure the plurality of rotor shrouds to the plurality of shroud seats in a one-to-one manner through a removable engagement.

2. The supporting assembly of claim 1, wherein the removable engagement is a snap-fit engagement, plug-in engagement, hooking engagement, socket-buckle engagement, or mating engagement.

3. The supporting assembly of claim 1, wherein the rotor shrouds each comprises a protecting surface having a circular sector shape defined between the converged end and the arc shaped end, and the protecting surface is inclined upward with respect to the rotor arms.

4. The supporting assembly of claim 3, wherein a central angle of the circular sector shaped protecting surface is in a range from about 60° to about 120°.

5. The supporting assembly of claim 1, wherein the each of the plurality of rotor shrouds comprises one or more connecting members extending from the arc shaped end to the converged end, the one or more connecting members are a plurality of protecting struts extending radially from the converged end to the arc shaped end.

6. The supporting assembly of claim 1, wherein the shroud seats each comprises a seat base and one or more buckles protruding from a surface of the seat base, the locking member of the rotor shroud further comprises one or more sockets, the one or more buckles engaging a corresponding socket to removably secure the rotor shroud to the shroud seat.

7. The supporting assembly of claim 6, wherein the socket defines a preplace hole, a locking hole, and a sliding channel communicating with both the preplace hole and the locking hole; the buckle comprises a sliding wall protruding from the surface of the seat base and a locking board connected to the sliding wall; the preplace hole is capable of receiving the buckle; the sliding wall is capable of being located in and engaged with the sliding channel; and the locking board is capable of being located in and engaged with the locking hole.

8. The supporting assembly of claim 7, wherein the buckle comprises a blocking wall protruding from the surface of the seat base and connected to both the sliding wall and the locking board.

9. The supporting assembly of claim 7, wherein the seat base defines a through hole above the locking board.

10. The supporting assembly of claim 6, wherein the socket and the buckle are arc shaped, and are capable of engaging with each other through a relative rotation between the socket and the buckle around the vertical axis.

11. The supporting assembly of claim 1, wherein the locking member comprises a plurality of sockets arranged around the vertical axis; the plurality of shroud seats each comprises a seat base and a plurality of buckles protruding from a surface of the seat base and arranged around the vertical axis; the plurality of sockets and the plurality of buckles are arc shaped and configured for engaging with each other in a one-to-one manner.

12. The supporting assembly of claim 1, wherein the locking member defines a lamp hole, the shroud seat comprises a lampshade, and the lampshade is received in the lamp hole.

13. The supporting assembly of claim 1, wherein each of the plurality of motor seats comprises a housing member defining a cavity to receive each of the plurality of shroud seats.

14. The supporting assembly of claim 1, wherein each of the plurality of shroud seats comprises a plurality of column protrusions, and the plurality of column protrusions define screw holes to receive screws securing the plurality of shroud seats to the plurality of motor seats.

15. The supporting assembly of claim 1, wherein the rotor arm comprises an arm body and at least one beam supporting the arm body, the at least one beam is substantially perpendicular to the arm body.

16. The supporting assembly of claim 1, wherein the plurality of motor seats is configured to have both the plurality of shroud seats and a plurality of rotor assemblies mounted thereon in a one-to-one manner.

17. An unmanned aerial vehicle comprising:
a supporting assembly comprising:
a base;
a plurality of rotor arms extending from the base, and each of the plurality of rotor arms comprising a proximal end secured to the base and a distal end opposite to the proximal end; and
a plurality of rotor shrouds, each of the plurality of rotor shrouds comprising a converged end removably engaged with and secured to the distal end of the rotor arm by rotating the each of the plurality of rotor shrouds with respect to the rotor arm around a vertical axis, an arc shaped end opposite to the converged end, and one or more connecting members extending from the arc shaped end to the converged end; and
a plurality of rotor assemblies mounted on the distal ends of the plurality of rotor arms in a one-to-one manner, each of the plurality of rotor assemblies comprising a rotor and an actuator.

18. The unmanned aerial vehicle of claim 17, wherein the supporting assembly further comprises a plurality of shroud seats and a plurality of motor seats, the plurality of motor seats are secured to the distal end of the plurality of rotor arms, and both the plurality of shroud seats and the plurality of rotor assemblies are mounted on the plurality of motor seats in a one-to-one manner, the plurality of rotor shrouds are removably mounted on the plurality of motor seats through the plurality of shroud seats in a one-to-one manner.

19. A rotor shroud apparatus comprising:
a rotor shroud comprising a locking member and a shroud body, the shroud body having a converged end and an arc shaped end opposite to the converged end, the locking member being connected to the shroud body at the converged end, and the shroud body and the locking member are integrated with each other as one piece; and
a shroud seat being configured to be mounted to a motor seat secured to a distal end of a rotor arm of an unmanned aerial vehicle and the rotor shroud
wherein the locking member of the rotor shroud is removably engaged with and secured to the distal end of the rotor arm through the shroud seat by rotating the rotor shroud with respect to the rotor arm around a vertical axis.

* * * * *